US011751066B2

(12) United States Patent
Buddhikot et al.

(10) Patent No.: US 11,751,066 B2
(45) Date of Patent: Sep. 5, 2023

(54) MANAGING ACCESS TO A SHARED SPECTRUM USING A DOMAIN PROXY

(71) Applicant: Nokia Solutions and Networks Oy, Espoo (FI)

(72) Inventors: Milind M. Buddhikot, Murray Hill, NJ (US); Mohammad Riaz Khawer, Murray Hill, NJ (US); Kutlay Erman, Murray Hill, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 21 days.

(21) Appl. No.: 17/058,807

(22) PCT Filed: May 25, 2018

(86) PCT No.: PCT/US2018/034640
§ 371 (c)(1),
(2) Date: Nov. 25, 2020

(87) PCT Pub. No.: WO2019/226172
PCT Pub. Date: Nov. 28, 2019

(65) Prior Publication Data
US 2021/0211889 A1 Jul. 8, 2021

(51) Int. Cl.
*H04W 88/18* (2009.01)
*H04W 16/16* (2009.01)
(Continued)

(52) U.S. Cl.
CPC .......... *H04W 16/16* (2013.01); *H04W 48/04* (2013.01); *H04W 72/0453* (2013.01); *H04W 72/51* (2023.01)

(58) Field of Classification Search
CPC . H04W 16/16; H04W 48/04; H04W 72/0453; H04W 72/048; H04L 41/0896; H04L 5/0058
See application file for complete search history.

(56) References Cited

U.S. PATENT DOCUMENTS

2014/0237547 A1* 8/2014 Bose .................. H04L 41/0896
  726/3
2015/0011234 A1* 1/2015 Wei .................. H04W 72/0453
  455/454
(Continued)

FOREIGN PATENT DOCUMENTS

CA         3022270 A1   11/2017
WO      2015084959 A1    6/2015

OTHER PUBLICATIONS

International Preliminary Report on Patentability dated Dec. 10, 2020 for International Application No. PCT/US2018/034640, 9 pages.

*Primary Examiner* — Shukri Taha
(74) *Attorney, Agent, or Firm* — Tong, Rea, Bentley & Kim, LLC

(57) ABSTRACT

A domain proxy receives a request from a base station for allocation of a first portion of a frequency band to support cellular communication in a geographic area that is indicated in the request. The frequency band is available for exclusive allocation to an incumbent device. The base station is required to vacate the first portion of the frequency band in response to the incumbent device arriving in the geographic area and being allocated a second portion of the frequency band that overlaps with the first portion. The domain proxy accesses a policy for the base station from a database and, based on the policy, selectively provides the request to a spectrum access server (SAS) that is responsible for allocating portions of the frequency band.

20 Claims, 10 Drawing Sheets

(51) Int. Cl.
*H04W 48/04* (2009.01)
*H04W 72/0453* (2023.01)
*H04W 72/51* (2023.01)

(56) References Cited

U.S. PATENT DOCUMENTS

2018/0132112 A1* 5/2018 Khoshnevisan .. H04W 72/0453
2021/0211889 A1* 7/2021 Buddhikot ............ H04W 16/16

* cited by examiner

MANAGING ACCESS TO A SHARED SPECTRUM USING A DOMAIN PROXY

BACKGROUND

Spectrum is the most precious commodity in deploying wireless networks such as a private enterprise network. Cellular communication systems, such as networks that provide wireless connectivity using Long Term Evolution (LTE) standards, provide more reliable service and superior quality-of-service (QoS) than comparable services provided by conventional contention-based services in unlicensed frequency bands, such as Wi-Fi. The most valuable spectrum available for cellular communication is at frequencies below 6 Gigahertz (GHz) because transmissions at these frequencies do not require a clear line of sight between the transmitter and the receiver. Much of the sub-6-GHz spectrum is already auctioned off as statically licensed spectrum to various mobile network operators (MNOs) that implement cellular communication system such as LTE networks. The 3.1-4.2 GHz spectrum is occupied by incumbents such as Fixed Satellite System (FSS) and federal incumbents such as U.S. government or military entities. For example, the 3550-3700 MHz frequency band (Citizens Broadband Radio Service, CBRS, band) was previously reserved for exclusive use by incumbents including the United States Navy and Fixed Satellite Service (FSS) earth stations. This band of the spectrum is often highly underutilized. Consequently, organizations and vertical industries such as package distribution companies, energy producers, ports, mines, hospitals, and universities do not have access to sub-6-GHz spectrum and are therefore unable to establish private enterprise networks to provide cellular service such as LTE.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
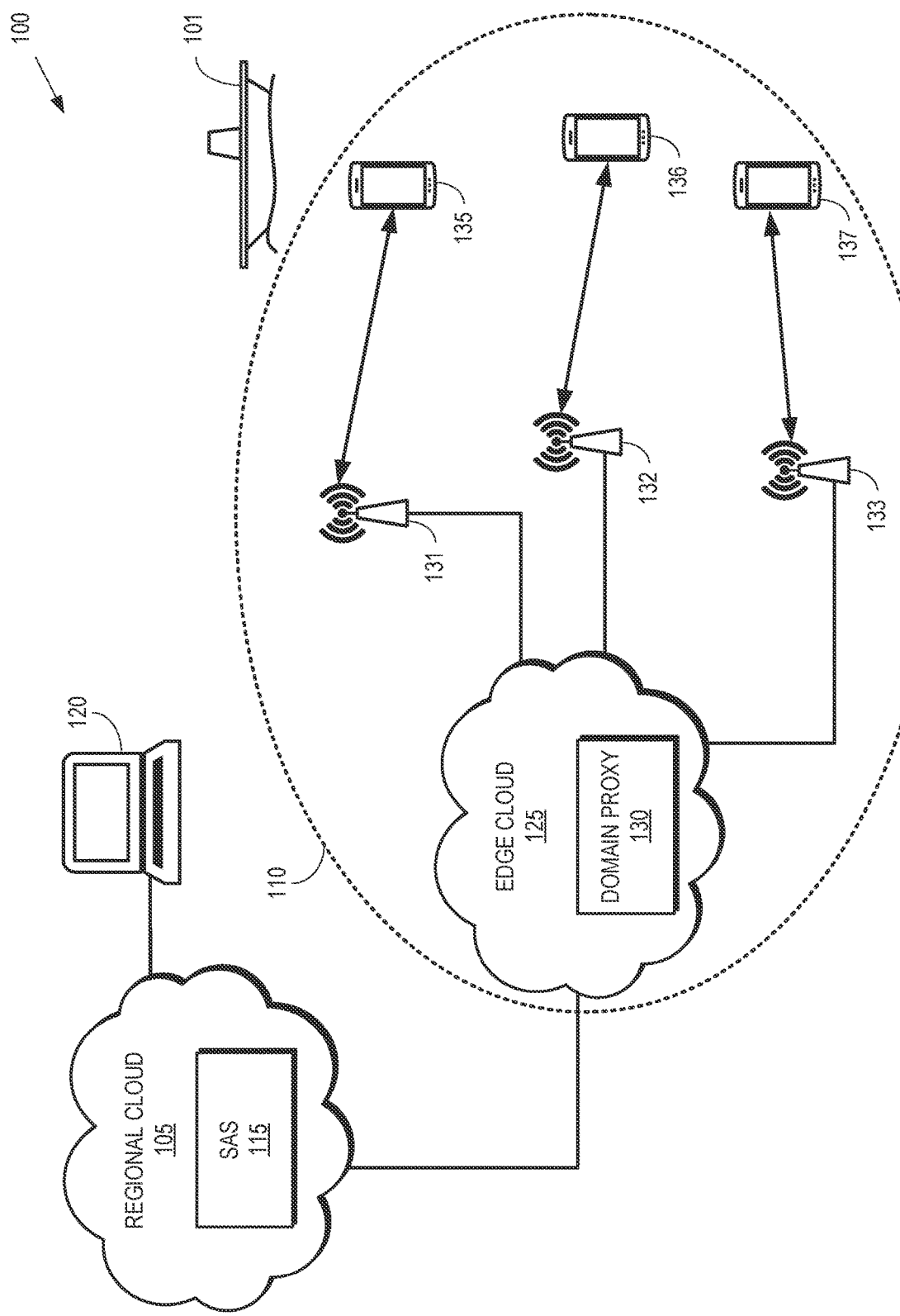
FIG. 1 is a block diagram of a communication system according to some embodiments.

The Federal Communication Commission (FCC) has begun offering bands of spectrum owned by federal entities for sharing with commercial operations. For example, newly issued FCC rules in 47 Code of Federal Regulations (CFR) Part 96 allows sharing of the 3550-3700 MHz Citizens Broadband Radio Service (CBRS) between incumbents and other operators. The CBRS operates according to a tiered access architecture that distinguishes between incumbents, operators that have received a priority access license (PAL) consistent with 47 CFR § 96.23, et seq., and general authorized access (GAA) operators that are authorized to implement one or more Citizens Band Service Devices (CBSDs) consistent with 47 CFR § 96.33, et seq. Incumbents, PAL licensees, and GAA operators are required to request access from a spectrum access server (SAS), which allocates frequency bands to the operators, e.g., for CBRS within the 3550-3700 MHz band. The frequency bands are allocated to the CBSDs associated with the operators within particular geographic areas and, in some cases, during particular time intervals. The SAS determines whether incumbents are present within corresponding geographic areas using an environmental sensing capability (ESC) that performs incumbent detection, e.g., using radar to detect the presence of a Navy ship in a port. Each SAS is able to serve multiple private enterprise networks that include a large number of CBSDs such as base stations, eNodeBs, microcells, picocells, and the like.

The tiered access architecture provides priority access to incumbents, which include Grandfathered Wireless Broadband Licensees that are authorized to operate on a primary basis on frequencies designated in 47 CFR § 96.11. When an incumbent is present in a particular geographic area, the incumbent is granted exclusive access to a portion of the CBRS spectrum. For example, if a Navy ship enters a port, communication systems on the ship are granted exclusive access to a 20-40 MHz band within the 3550-3700 MHz band. Operators that have received a PAL and GAA operators are required to vacate the band allocated to the ship. A PAL license grants exclusive access to a portion of the 3550-3700 MHz band within a predetermined geographic area as long as no incumbents have been allocated an overlapping portion of the 3550-3700 MHz band within the predetermined geographic area. The GAA operators are given access to a portion of the 3550-3700 MHz band within a geographic area as long as no incumbents or PAL licensees have been allocated an overlapping portion in the same geographic area during a concurrent time interval. The GAA operators are also required to share the allocated portion of the 3550-3700 MHz band if other GAA operators are allocated the same portion.

Domain proxies in the private enterprise networks (as defined by the WINNFORUM SAS-CBSD protocol standards) serve as transparent aggregators of CBRS band signalling traffic to/from the CBSDs to the SAS. The domain proxies also aggregate access requests from the CBSDs into a smaller number of messages for transmission to the SAS, thereby reducing the signalling load on the SAS. However, the CBSDs associated with a domain proxy do not necessarily operate according to the same policies or during the same time intervals. For example, a private enterprise network deployed in a mall provides services to numerous stores that may have different operating hours. Conventional domain proxies do not support managing different CBSDs according to different policies. Consequently, a conventional domain proxy as defined by the WINNForum standards is not able to manage the CBSDs in the different stores of the mall using different access control policies so that access requests received from CBSDs outside of the operating hours of the stores are not permitted.

FIGS. 1-10 disclose embodiments of a domain proxy that receives a request from a Citizens Band Service Device (CBSD) for allocation of a first portion of a frequency band to support cellular communication in a geographic area that is indicated in the request. The CBSD is referred to herein as a base station. The frequency band is also available for exclusive allocation to an incumbent device and the base station is required to vacate the first portion of the frequency band in response to the incumbent device arriving in the geographic area and being allocated a second portion of the frequency band that overlaps with the first portion. The domain proxy accesses a policy for the base station from a database and selectively provides the request to a spectrum access server (SAS) based on the policy. For example, the domain proxy can examine a value in a mandatory field of the request (such as a field identifying the base station or a group including the base station) and provide the request to the SAS if the value indicates that the base station is permitted to request allocation of the first portion of the frequency band. Otherwise, the request is rejected and not provided to the SAS. In some embodiments, the domain proxy selectively aggregates the request with one or more requests received from other base stations based on the policy. The policy includes information such as information indicating a group of base stations including the base station, an active time interval for the base station (or corresponding group), or information indicating whether the base station (or corresponding group) is active, inactive, or blocked. Coexistence management functions are configured in some embodiments of the domain proxy, which can also configure parameters of the base station such as a serial number, a geographic location, preferred frequencies in the frequency band, secondary frequencies in the frequency band, a bandwidth, antenna height, or transmit power. Some embodiments of the domain proxy perform a traffic analysis, e.g., to determine latencies with the SAS, and configure parameters of the domain proxy based on the analysis. For example, aggregation factors, features, or other capabilities of the domain proxy can be configured based on the traffic analysis.

FIG. 1 is a block diagram of a communication system 100 according to some embodiments. The communication system 100 operates in accordance with the FCC rules set forth in 47 Code of Federal Regulations (CFR) Part 96, which allows sharing of the 3550-3700 MHz Citizens Broadband Radio Service (CBRS) between incumbents and other operators. However, some embodiments of the communication system 100 operate in accordance with other rules, standards, or protocols that support sharing of a frequency band between incumbents and other devices such that the frequency band is available for exclusive allocation to an incumbent device if the incumbent device is present in a geographic area. In that case, the other devices are required to vacate any portion of the frequency band that overlaps with another portion of the frequency band that is allocated to the incumbent device. For example, if the communication system 100 is deployed (at least in part) proximate a port and a Navy ship such as an aircraft carrier 101 arrives in the port, devices in a geographic area proximate the port that are providing wireless connectivity in a portion of the frequency band allocated to the aircraft carrier 101 are required to vacate the portion of the frequency band to provide the aircraft carrier 101 with exclusive access to the frequency band within the geographic area.

The communication system 100 includes a regional cloud 105 that provides cloud-based support for a private enterprise network 110. Some embodiments of the regional cloud 105 include one or more servers that are configured to provide operations and maintenance (O&M) management, a customer portal, network analytics, software management, and central security for the private enterprise network 110. The regional cloud 105 also includes an SAS 115 to allocate frequency bands to operators, e.g., to the private enterprise network 110 for CBRS within the 3550-3700 MHz band. Operation of the SAS 115 is disclosed in more detail below. A single SAS 115 is shown in FIG. 1 in the interest of clarity. If multiple SAS are present in the communication system 100, the SAS are able to communicate with each other over corresponding SAS-SAS interfaces. The SAS 115 is able to serve multiple private enterprise networks, although a single private enterprise network 110 is shown in FIG. 1 in the interest of clarity.

The regional cloud 105 is configured via user interface portals to one or more external computers 120, only one shown in FIG. 1 in the interest of clarity. For example, the external computer 120 can provide a customer user interface portal for service management, a digital automation cloud management user interface portal, and an SAS user interface portal that is used to configure the SAS 115.

The private enterprise network 110 includes an edge cloud 125 that communicates with the regional cloud 105 to support a plug-and-play deployment of the private enterprise network 110. Some embodiments of the edge cloud 125 support auto configuration and self-service, industrial protocols, local connectivity with low latency, LTE-based communication and local security, high availability, and other optional applications for the private enterprise network 110. In the illustrated embodiment, the edge cloud 125 implements a domain proxy 130 that provides managed access and policy control to a set of CBSDs 131, 132, 133 that are implemented using base stations, base station routers, mini-macrocells, microcells, indoor/outdoor picocells, femtocells, and the like. As used herein, the term "base station" refers to any device that provides wireless connectivity and operates as a CBSD in the private enterprise network 110 as either category A CBSD (Indoor), or Category B CBSD (outdoor). The CBSDs 131, 132, 133 are therefore referred to herein as the base stations 131, 132, 133 and collectively as "the base stations 131-133." Some embodiments of the domain proxy 130 are implemented in the regional cloud 105.

The domain proxy 130 mediates between the SAS 115 and the base stations 131-133. In order to utilize the shared spectrum, the base stations 131-133 transmit requests towards the SAS 115 to request allocation of a portion of a frequency band. The requests include information identifying the portion of the frequency band, a geographic area corresponding to a coverage area of the requesting base station, and, in some cases, a time interval that indicates when the requested portion of the frequency band is to be used for communication. In the illustrated embodiment, the coverage area of the base stations 131-133 corresponds to the area encompassed by the private enterprise network 110. Some embodiments of the domain proxy 130 reduce the signal load between the domain proxy 130 and the SAS 115 by aggregating requests from multiple base stations 131-133 into a smaller number of messages that are transmitted from the domain proxy 130 to the SAS 115. The base stations 131-133 provide wireless connectivity to corresponding user equipment 135, 136, 137 (collectively referred to herein as "the user equipment 135-137") in response to the SAS 115 allocating portions of the frequency band to the base stations 131-133.

The requests transmitted by the base stations 131-133 do not necessarily include the same information. Some embodiments of the requests from the base stations 131-133 include information indicating different portions of the frequency band, different geographic areas, or different time intervals. For example, the base stations 131-133 request portions of the frequency band for use in different time intervals if the private enterprise network 110 is deployed in a mall or shopping center and the base stations 131-133 are used to provide wireless connectivity within different stores that have different operating hours. The domain proxy 130 therefore manages the base stations 131-133 using separate (and potentially different) policies on a per-CBSD basis. In some embodiments, the domain proxy 130 accesses the policies for the base stations 131-133 in response to receiving a request from the corresponding base station 131-133. The domain proxy 130 determines whether the base station 131-133 is permitted to access the SAS 115 based on the policy, e.g., by comparing information in the policy to information in one or more mandatory fields of the request. The domain proxy 130 selectively provides the requests to the SAS 115 depending on whether the base station 131-133 is permitted to access the SAS 115. If so, the request is transmitted to the SAS 115 or aggregated with other requests for transmission to the SAS 115. Otherwise, the request is rejected.

Figure 2:
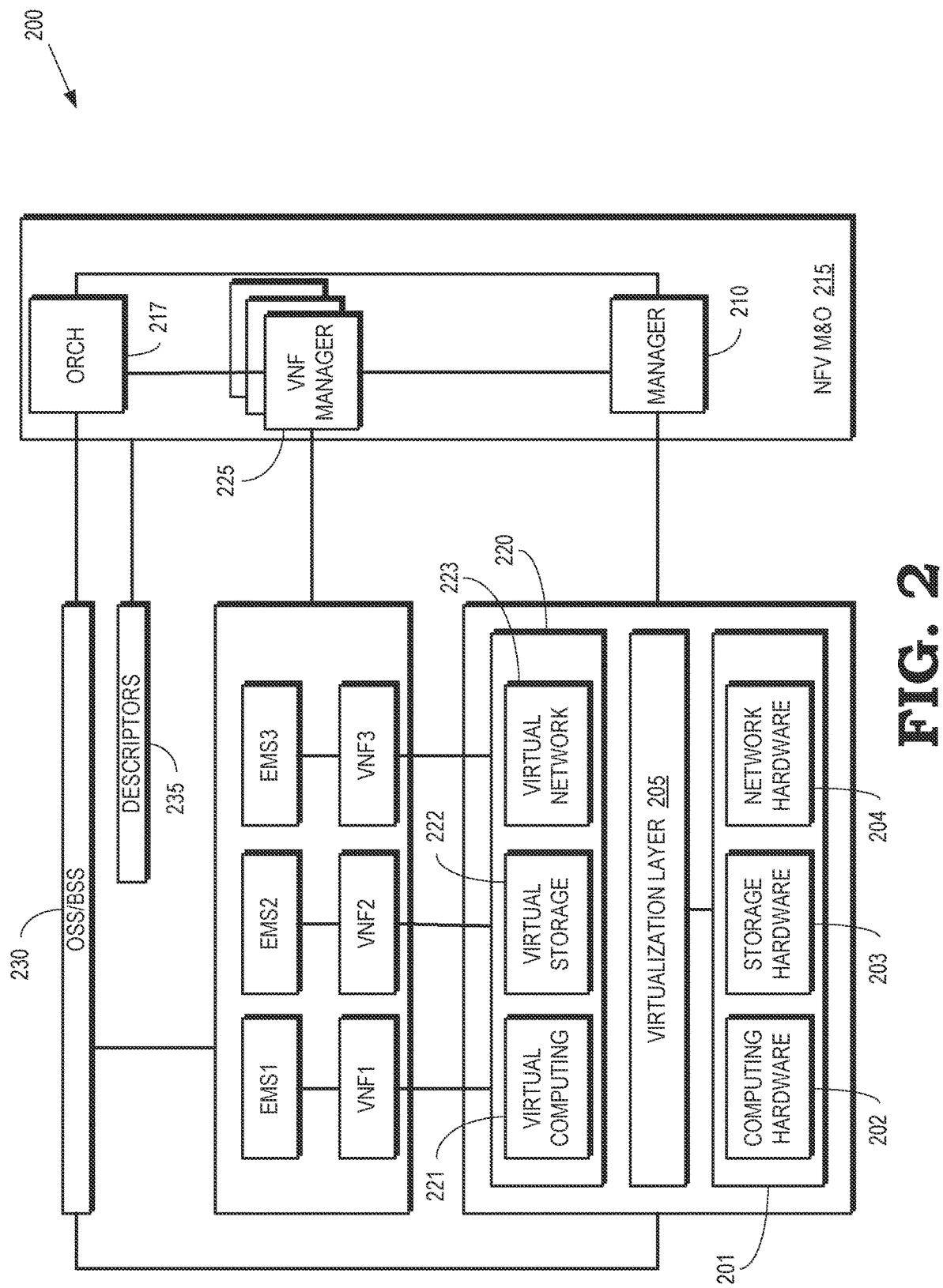
FIG. 2 is a block diagram of a network function virtualization (NFV) architecture according to some embodiments.

FIG. 2 is a block diagram of a network function virtualization (NFV) architecture 200 according to some embodiments. The NFV architecture 200 is used to implement some embodiments of the communication system 100 shown in FIG. 1. The NFV architecture 200 includes hardware resources 201 including computing hardware 202 such as one or more processors or other processing units, storage hardware 203 such as one or more memories, and network hardware 204 such as one or more transmitters, receivers, or transceivers. A virtualization layer 205 provides an abstract representation of the hardware resources 201. The abstract representation supported by the virtualization layer 205 can be managed using a virtualized infrastructure manager 210, which is part of the NFV management and orchestration (M&O) module 215. Some embodiments of the manager 210 are configured to collect and forward performance measurements and events that may occur in the NFV architecture 200. For example, performance measurements may be forwarded to an orchestrator (ORCH) 217 implemented in the NFV M&O 215. The hardware resources 201 and the virtualization layer 205 may be used to implement virtual resources 220 including virtual computing 221, virtual storage 222, and virtual networking 223.

Virtual networking functions (VNF1, VNF2, VNF3) run over the NFV infrastructure (e.g., the hardware resources 201) and utilize the virtual resources 220. For example, the virtual networking functions (VNF1, VNF2, VNF3) may be implemented using virtual machines supported by the virtual computing resources 221, virtual memory supported by the virtual storage resources 222, or virtual networks supported by the virtual network resources 223. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 225 that exchanges information and coordinates actions with the manager 210 or the orchestrator 217.

The NFV architecture 200 may include an operation support system (OSS)/business support system (BSS) 230. The OSS/BSS 230 deals with network management including fault management using the OSS functionality. The OSS/BSS 230 also deals with customer and product management using the BSS functionality. Some embodiments of the NFV architecture 200 use a set of descriptors 235 for storing descriptions of services, virtual network functions, or infrastructure supported by the NFV architecture 200. For example, the descriptors 235 can be used to store descriptions of a virtual network function implementation of the agent 175 shown in FIG. 1. Information in the descriptors 235 may be updated or modified by the NFV M&O 215.

The NFV architecture 200 can be used to implement network slices that provide user plane or control plane functions. A network slice is a complete logical network that provides communication services and network capabilities, which can vary from slice to slice. User equipment can concurrently access multiple slices. Some embodiments of user equipment provide Network Slice Selection Assistance Information (NSSAI) parameters to the network to assist in selection of a slice instance for the user equipment. A single NSSAI may lead to the selection of several slices. The NFV architecture 200 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different slices.

Figure 3:
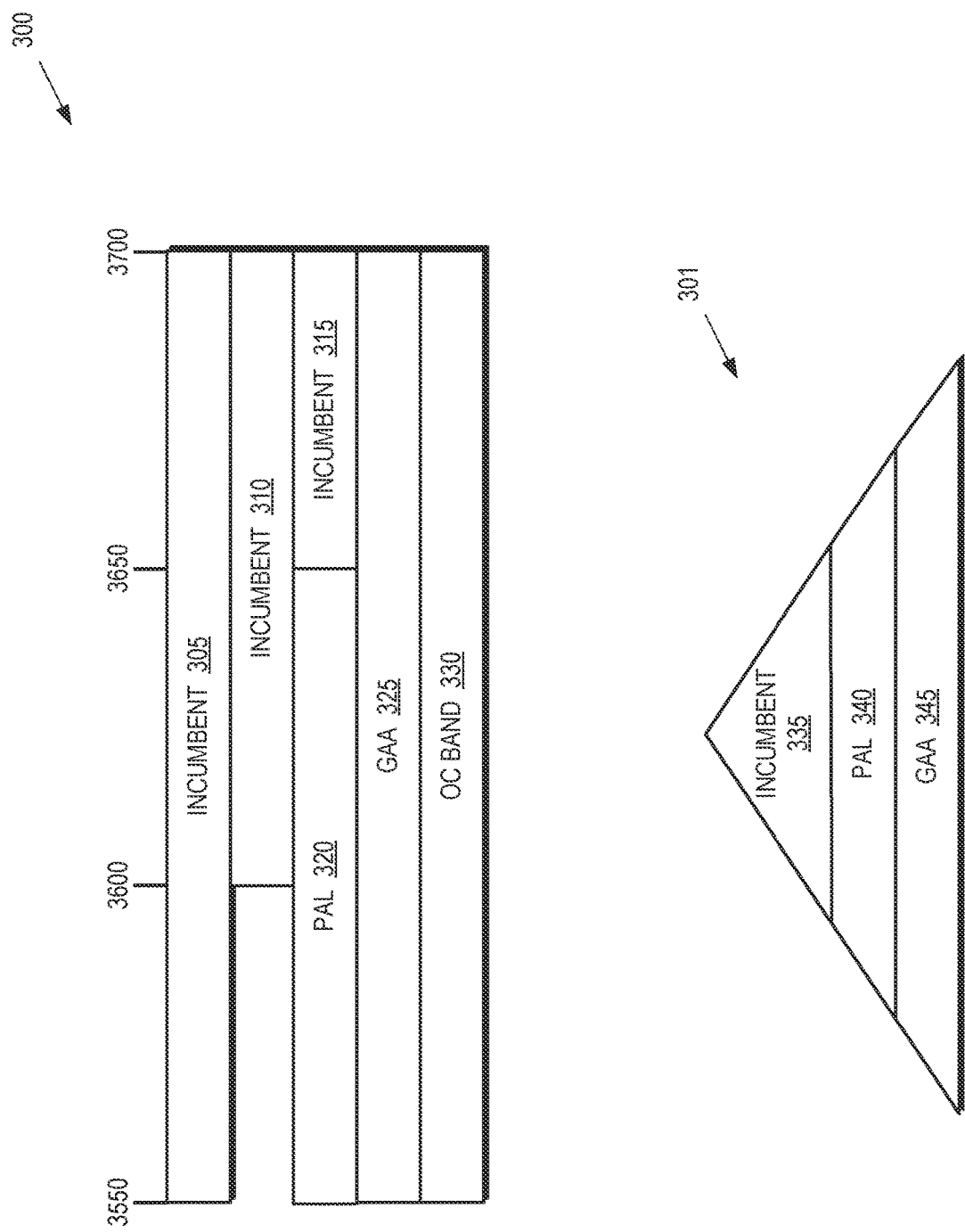
FIG. 3 is a block diagram illustrating an allocation of frequency bands and an access priority for incumbents, licensed users, and general access users according to some embodiments.

FIG. 3 is a block diagram illustrating an allocation 300 of frequency bands and an access priority 301 for incumbents, licensed users, and general access users according to some embodiments. The allocation 300 and the access priorities 301 are used to determine whether CBSDs such as the base stations 131-133 shown in FIG. 1 are given permission to establish a wireless communication links in portions of the frequency band. The frequency band extends from 3550 MHz to 3700 MHz and therefore corresponds to the spectrum allocated for CBRS. An SAS such as the SAS 115 shown in FIG. 1 allocates portions of the frequency band to devices for providing wireless connectivity within a geographic area. For example, the SAS can allocate 20-40 MHz portions of the frequency band to different devices.

Portions of the frequency band are allocated to incumbent federal radio location devices, such as Navy ships, from the block 305, which corresponds to all of the frequencies in the available frequency band. Portions of the frequency band are allocated to incumbent FSS receive-only earth stations from the block 310. Portions of the frequency band are allocated to grandfathered incumbent wireless broadband services from the block 315. As discussed herein, the portions of the frequency band are allocated from the blocks 305, 310, 315 for exclusive use by the incumbent.

Operators that have received a priority access license (PAL) consistent with 47 CFR § 96.23, et seq. are able to request allocation of portions of the frequency band in the block 320. The portion of the frequency band that is allocated to an operator holding a PAL is available for exclusive use by the operator in the absence of any incumbents in an overlapping frequency band and geographic area. For example, the SAS can allocate a PAL channel in any portion of the entire 150 MHz of CBRS band as long as it is not preempted by the presence of an incumbent. Portions of the frequency band within the block 325 are available for allocation to general authorized access (GAA) operators that are authorized to implement one or more CBSDs consistent with 47 CFR § 96.33, et seq. The GAA operators provide wireless connectivity in the allocated portion in the absence of any incumbents or PAL licensees on an overlapping frequency band and geographic area. The GAA operators are also required to share the allocated portion with other GAA operators, if present. Portions of the frequency band within the block 330 are available to other users according to protocols defined by the Third Generation Partnership Project (3GPP).

The access priority 301 indicates that incumbents have the highest priority level 335. Incumbents are therefore always granted exclusive access to a request to portion of the frequency band within a corresponding geographic area. Lower priority operators are required to vacate the portion of the frequency band allocated to the incumbents within the geographic area. The access priority 301 indicates that PAL licensees have the next highest priority level 340, which indicates that PAL licensees receive exclusive access to an allocated portion of the frequency band in the absence of any incumbents. The PAL licensees are also entitled to protection from other PAL licensees within defined temporal, geographic, and frequency limits of their PAL. The GAA operators (and, in some cases, operators using other 3GPP protocols) received the lowest priority level 345. The GAA operators are therefore required to vacate portions of the frequency band that overlap with portions of the frequency band allocated to either incumbents or PAL licensees within an overlapping geographic area.

Figure 4:
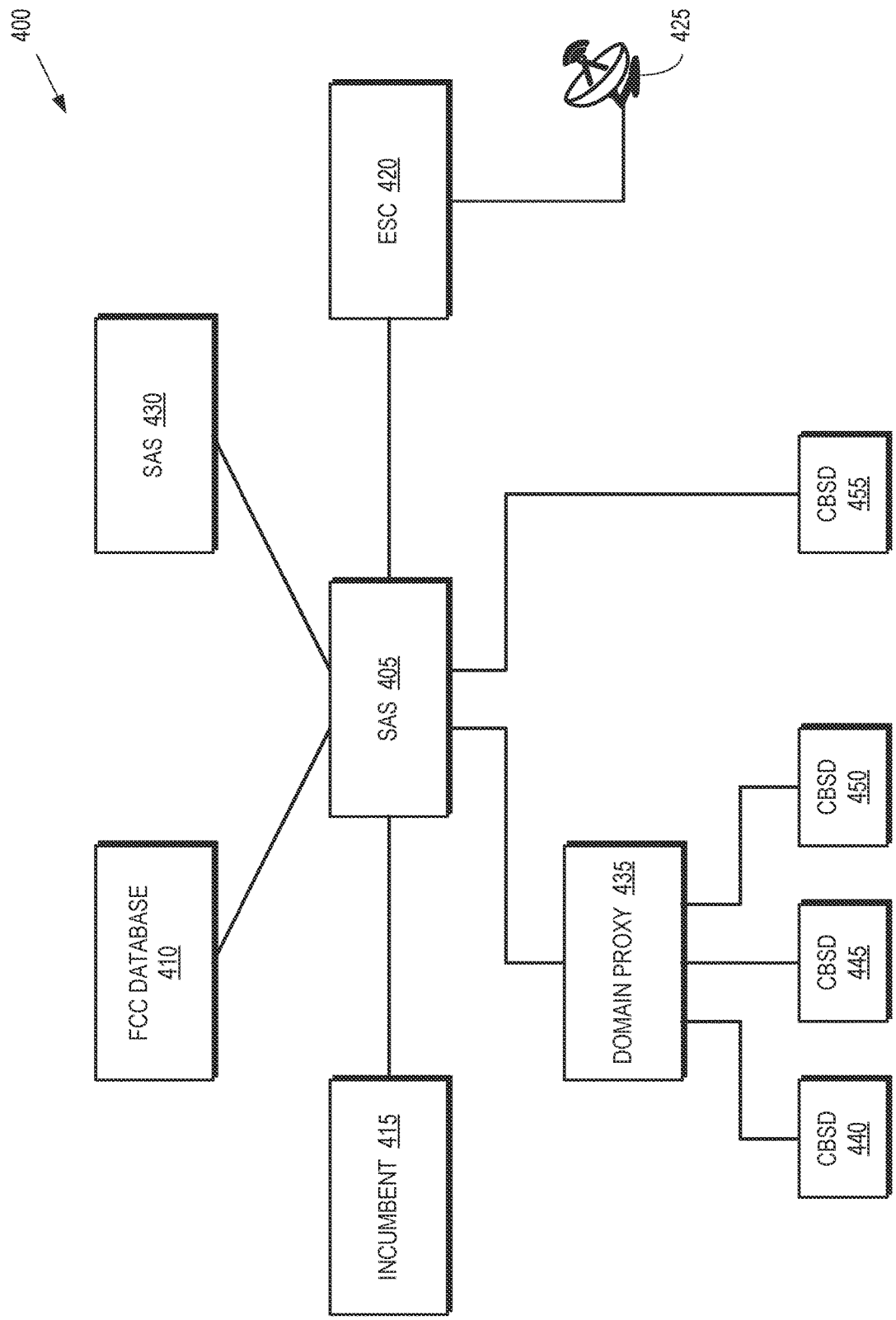
FIG. 4 is a block diagram of a communication system that implements tiered spectrum access according to some embodiments.

FIG. 4 is a block diagram of a communication system 400 that implements tiered spectrum access according to some embodiments. In the illustrated embodiment, the communication system 400 implements tiered spectrum access in the 3550-3700 CBRS band via a WInnForum architecture. The communication system 400 includes an SAS 405 that performs operations including incumbent interference determination and channel assignment, e.g., for CBRS channels shown in FIG. 3. An FCC database 410 stores a table of frequency allocations that indicate frequencies allocated to incumbent users and PAL licensees. An informing incumbent 415 provides information indicating the presence of the incumbent (e.g., a coverage area associated with the incumbent, and allocated frequency range, a time interval, and the like) to the SAS 405. The SAS 405 allocates other portions of the frequency range to provide exclusive access to the informing incumbent 415 within the coverage area. An environmental sensing capability (ESC) 420 performs incumbent detection to identify incumbents using a portion of a frequency range within the geographic area, e.g., using a radar sensing apparatus 425. Some embodiments of the SAS 405 are connected to other SAS 430 via corresponding interfaces so that the SAS 405, 430 are able to coordinate allocation of portions of the frequency range in geographic areas or time intervals.

A domain proxy 435 mediates communication between the SAS 405 and one or more CBSD 440, 445, 450 via corresponding interfaces. The domain proxy 435 receives channel access requests from the CBSDs 440, 445, 450 and verifies that the CBSDs 440, 445, 450 are permitted to request channel allocations from the SAS 405. The domain proxy 435 forwards requests from the permitted CBSDs 440, 445, 450 to the SAS 405. In some embodiments, the domain proxy 435 aggregates the requests from the permitted CBSDs 440, 445, 450 before providing the aggregated request to the SAS 405. The domain proxy 435 aggregates requests based on an aggregation function that is a combination of two parameters: (1) a maximum number of requests that can be aggregated into a single message and (2) a maximum wait duration for arrival of requests that are to be aggregated into a single message. For example, if the wait duration is set to 300 ms and the maximum number of requests is 500, the domain proxy accumulates receive requests until the wait duration reaches 300 ms or the number of accumulated requests which is 500, whichever comes first. If only a single request arrives within the 300 ms wait duration, the "aggregated" message includes a single request.

Thus, from the perspective of the SAS 405, the domain proxy 435 operates as a single entity that hides or abstracts presence of the multiple CBSDs 440, 445, 450 and conveys communications between the SAS 405 and the CBSDs 440, 445, 450. One or more CBSD 455 (only one shown in the interest of clarity) are connected directly to the SAS 405 and can therefore transmit channel access requests directly to the SAS 405. Additional discussion of this architecture is provided in Appendix B, from the Wireless Innovation Forum, entitled "Requirements for Commercial Operation in the U.S. 3550-3700 MHz Citizens Broadband Radio Service Band", Working Document WINNF-TS-0112, Version V1.4.130, Jan. 16, 2018, which is incorporated by reference herein in its entirety.

Figure 5:
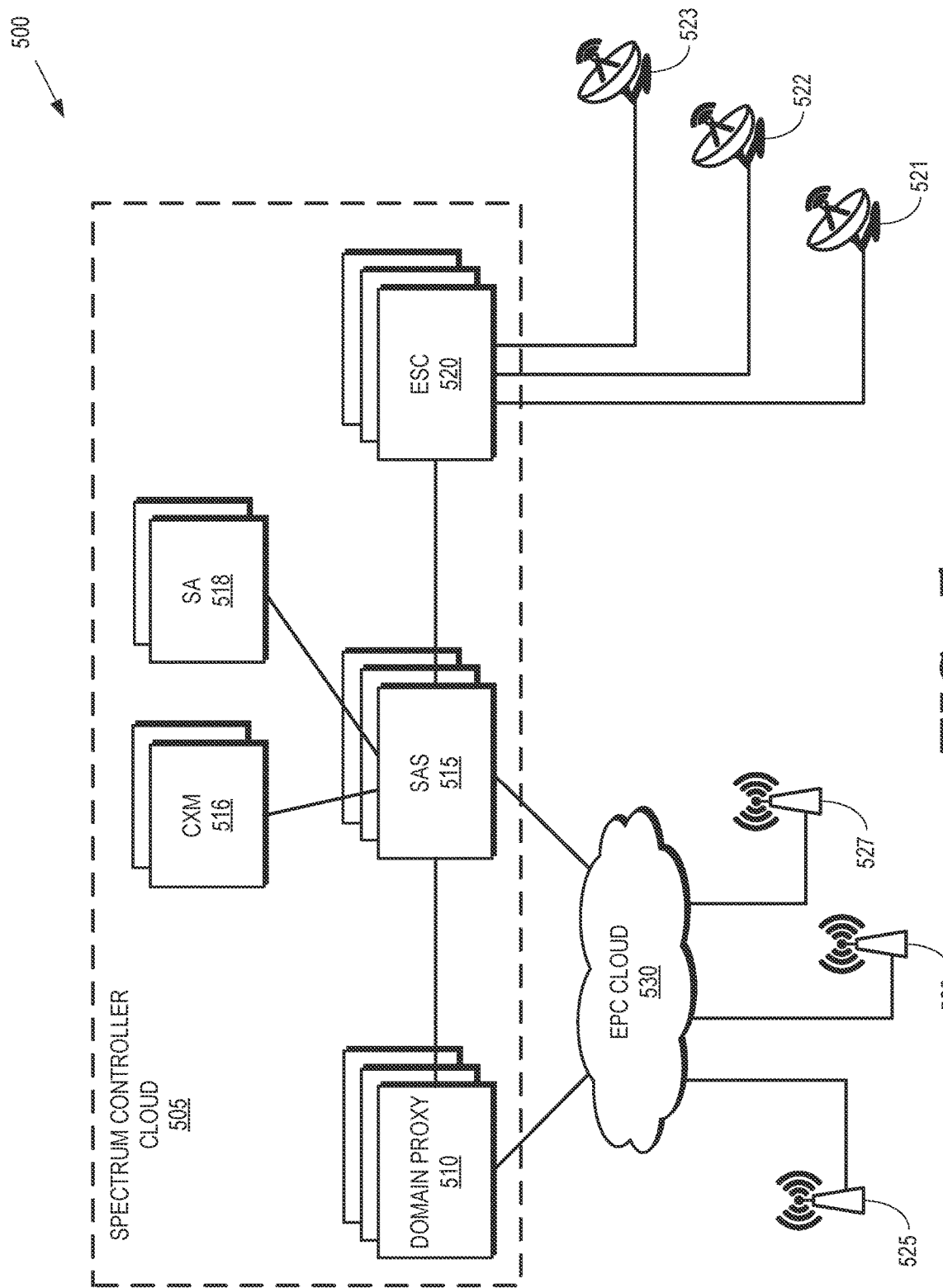
FIG. 5 is a block diagram of a communication system that implements a spectrum controller cloud to support deployment of private enterprise networks in a shared spectrum according to some embodiments.

FIG. 5 is a block diagram of a communication system 500 that implements a spectrum controller cloud 505 to support deployment of private enterprise networks in a shared spectrum according to some embodiments. The spectrum controller cloud 505 instantiates multiple instances of domain proxies 510 that support one or more private enterprise networks. The spectrum controller cloud 505 also instantiates multiple SAS instances 515 that support one or more private enterprise networks. Although not shown in FIG. 5, the SAS instances 515 can be connected to other SAS instances, e.g., in other clouds, via corresponding interfaces. Coexistence management (CXM) functions 516 and spectrum analytics (SA) functions 518 are also instantiated in the spectrum controller cloud 505.

One or more ESC instances 520 are instantiated and used to detect the presence of incumbents. In the illustrated embodiment, standalone ESC sensors 521, 522, 523 (collectively referred to herein as "the sensors 521-523") are used to monitor a frequency band to detect the presence of an incumbent such as a Navy ship. The ESC instances 520 notify the corresponding instance of the SAS 515 in response to detecting the presence of an incumbent in a corresponding geographic area. The SAS 515 is then able to instruct non-incumbent devices that serve the geographic area to vacate portions of the spectrum overlapping with the spectrum allocated to the incumbent, e.g., by defining a DPA.

One or more base stations 525, 526, 527 (collectively referred to herein as "the base stations 525-527") in a private enterprise network communicate with one or more of the domain proxies 510 and the SAS instances 515 via an evolved packet core (EPC) cloud 530. The base stations 525-527 have different operating characteristics. For example, the base station 525 operates according to a PAL in the 3.5 GHz frequency band, the base station 526 operates according to GAA in the 3.5 GHz frequency band, and the base station 525 operates according to a PAL and GAA in the 3.5 GHz frequency band. The base stations 525-527 are configured as Category A (indoor operation with a maximum power of 30 dBm) and Category B (outdoor operation with a maximum power of 47 dBm). However, in other embodiments, one or more of the base stations 525-527 are configured as either Category A or Category B. The EPC cloud 530 provides functionality including LTE EPC operation support system (OSS) functionality, analytics such as traffic analytics used to determine latencies, and the like.

Figure 6:
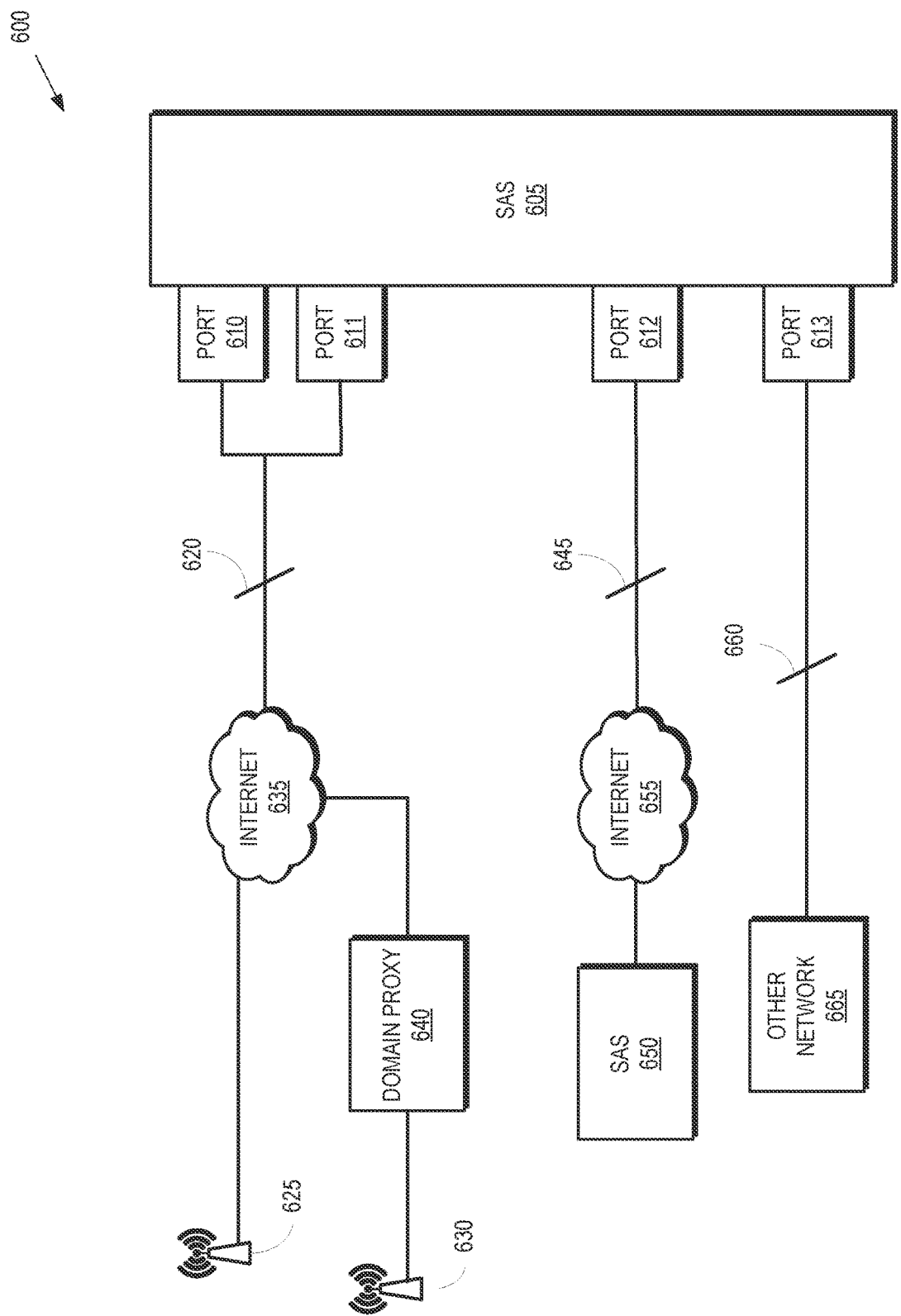
FIG. 6 is a block diagram of communication system including interfaces between CBSDs and an SAS according to some embodiments.

FIG. 6 is a block diagram of communication system 600 including interfaces between CBSDs and an SAS 605 according to some embodiments. The SAS 605 is used to implement some embodiments of the SAS 115 shown in FIG. 1, the SAS 405, 430 shown in FIG. 4, and the instances of the SAS 515 shown in FIG. 5. The SAS 605 includes ports 610, 611, 612, 613 (collectively referred to herein as "the ports 610-613") that provide access to the SAS 605.

An interface 620 supports communication between the SAS 605 and CBSDs 625, 630 via a network such as the Internet 635 and the ports 610, 611. The CBSD 625 is connected directly to the SAS 605 via the interface 620. The CBSD 630 is connected to the SAS 605 via a domain proxy 640 that is connected to the SAS 605 by the interface 620. The domain proxy 640 corresponds to some embodiments of the domain proxy 130 shown in FIG. 1, the domain proxy 435 shown in FIG. 4, and the instances of the domain proxy 510 shown in FIG. 5. An interface 645 supports communication between the SAS 605 and one or more other SAS 650 (only one shown in FIG. 6 in the interest of clarity) via a network such as the Internet 655 and the port 612. The SAS 650 can be owned and operated by other providers. An interface 660 supports communication between the SAS 605 and one or more other networks 665 (only one shown in FIG. 6 in the interest of clarity) via the port 613.

Figure 7:
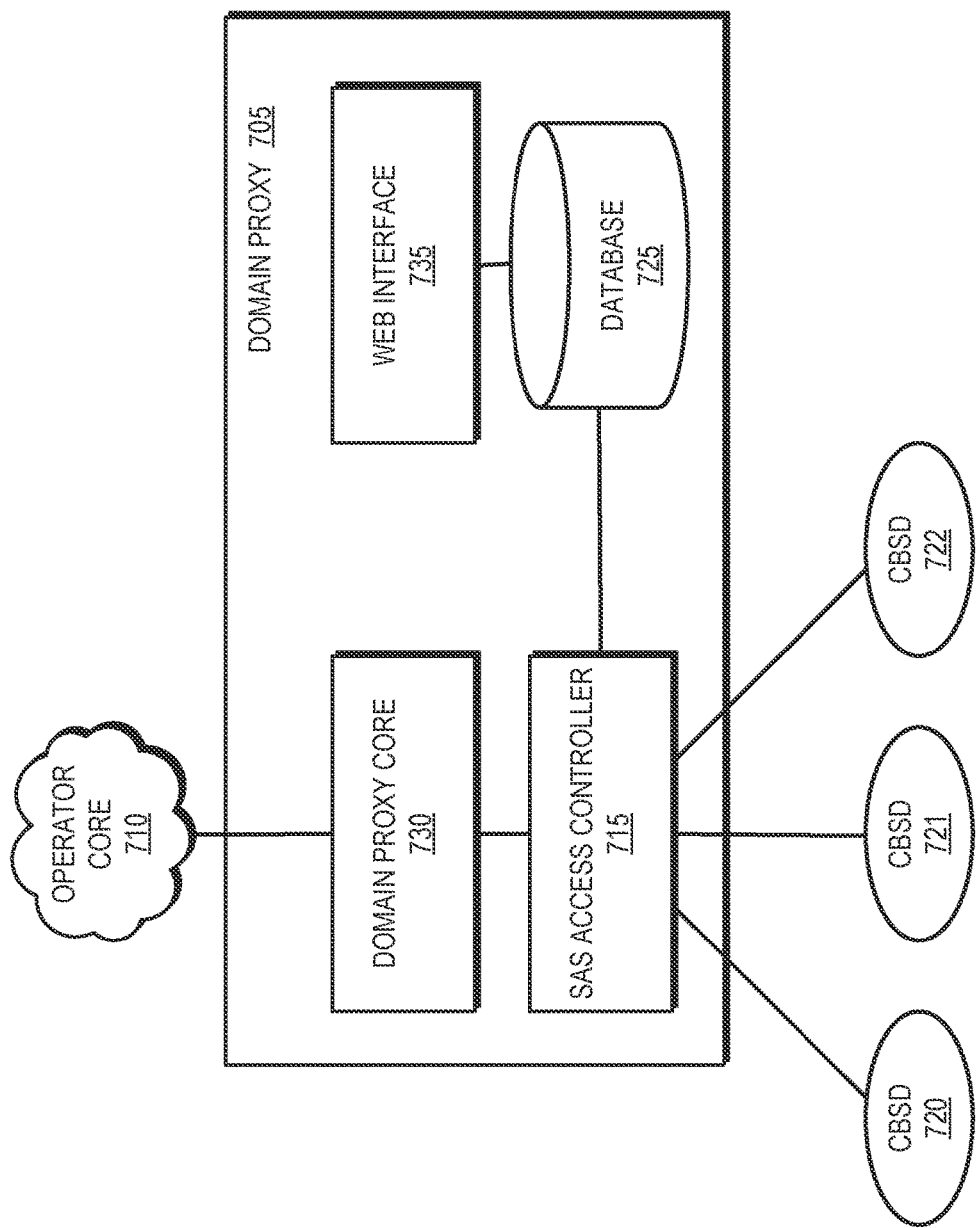
FIG. 7 is a block diagram of a communication system that includes a domain proxy to mediate communication between a Citizens Broadband Service Device (CBSD) and a spectrum access server (SAS) according to some embodiments.

FIG. 7 is a block diagram of a communication system 700 that includes a domain proxy 705 to mediate communication between CBSD and an SAS according to some embodiments. The domain proxy 705 is used to implement some embodiments of the domain proxy 130 shown in FIG. 1, the domain proxy 435 shown in FIG. 4, the instances of the domain proxy 510 shown in FIG. 5, and the domain proxy 640 shown in FIG. 6. In the illustrated embodiment, the domain proxy 705 is connected to an SAS over an interface (such as the interface 620 shown in FIG. 6) via an operator core network 710. However, in other embodiments, the domain proxy 705 is connected to the SAS via the Internet without necessarily traversing an operator core network.

An SAS access controller 715 receives access requests from one or more CBSD 720, 721, 722, which are collectively referred to herein as "the CBSDs 720-722." As discussed herein, the CBSDs 720-722 are also referred to herein as base stations and the CBSDs 720-722 represent some embodiments of the base stations 131-133 shown in FIG. 1, the CBSDs 440, 445, 450, 455 shown in FIG. 4, the base stations 525-527 shown in FIG. 5, and the CBSDs 625, 630 shown in FIG. 6. In response to receiving an access request from one of the CBSDs 720-722, the SAS access controller 715 accesses or retrieves a policy for the requesting CBSD from a database 725. The policy includes information that is used to determine whether the requesting CBSD is permitted to request allocation of resources from the SAS. Some embodiments of the policy include information indicating a group that includes the requesting CBSD, whether the CBSD or group is active, inactive, or blocked, whether the CBSD is authorized to request resources from the SAS, time intervals in which the CBSD or group is active, and the like. Some embodiments of the policy also include information identifying an operator of the CBSD, a location of the CBSD, a CBSD identifier, a serial number, an antenna height, an identifier of a grant of access to the SAS, a starting frequency of a granted portion of the frequency band, and ending frequency, a bandwidth, an assigned power, and an activation policy for the CBSD.

The SAS access controller 715 determines whether the access request is permitted based on the policy retrieved from the database 725. For example, the SAS access controller 715 determines that the access request is not permitted if the policy indicates that the CBSD is inactive, blocked, or not authorized to request resources. For another example, the SAS access controller 715 determines that the access request is permitted if the policy indicates that the CBSD is active and authorized to request resources. Some embodiments of the SAS controller 715 provide a filtering mechanism that is used to filter access requests based on mandatory fields in the access request messages. Erroneous messages are rejected so that they are not forwarded to the SAS, which reduces the workload on the SAS because the SAS only receives valid messages from the CBSDs 720-722. Managing the workload on the SAS is important because an SAS is required to manage millions of CBSDs concurrently in some embodiments.

Access requests that are permitted, e.g., as determined by the SAS access controller 715, are provided to a domain proxy core 730 that is responsible for forwarding the permitted access requests to the SAS via the operator core 710. Some embodiments of the domain proxy core 730 aggregate permitted requests from the CBSDs 720-722. For example, if the SAS access controller 715 determines that a first access request from the CBSD 720 and a second access request from the CBSD 720 are both permitted, the domain proxy core 730 aggregates the first and second access requests into a single message that is transmitted to the SAS via the operator core 710.

A web interface 735 is used to facilitate configuration of the domain proxy 705, e.g., by technicians or engineers. In some cases, information received via the web interface 735 is used to configure parameters of the domain proxy 705 such as an aggregation factor, domain proxy features, domain proxy capabilities, and the like. Policies for the CBSD 720-722 are provided to the database 725 via the web interface 735. The policies can therefore be installed or modified using the web interface 735. For example, a technician can install the CBSD 720 and configure the database 725 with a test policy that is used to test the operation of the CBSD 720. Once the CBSD 720 is correctly installed, the technician modifies the policy for the CBSD 720 in the database 725 so that the CBSD 720 becomes operational in response to a network administrator activating the deployed CBSDs 720-722 to launch the service. Other parameters of the policies can also be established or modified via the web interface 735 such as adding or removing CBSD from one or more groups, specifying a time interval that a CBSD or group is active, and configuring parameters of the CBSDs 720-722. The configurable parameters include a serial number, a location, a preferred frequency, a secondary frequency, a bandwidth, an antenna height, a transmit power, and the like.

Figure 8:
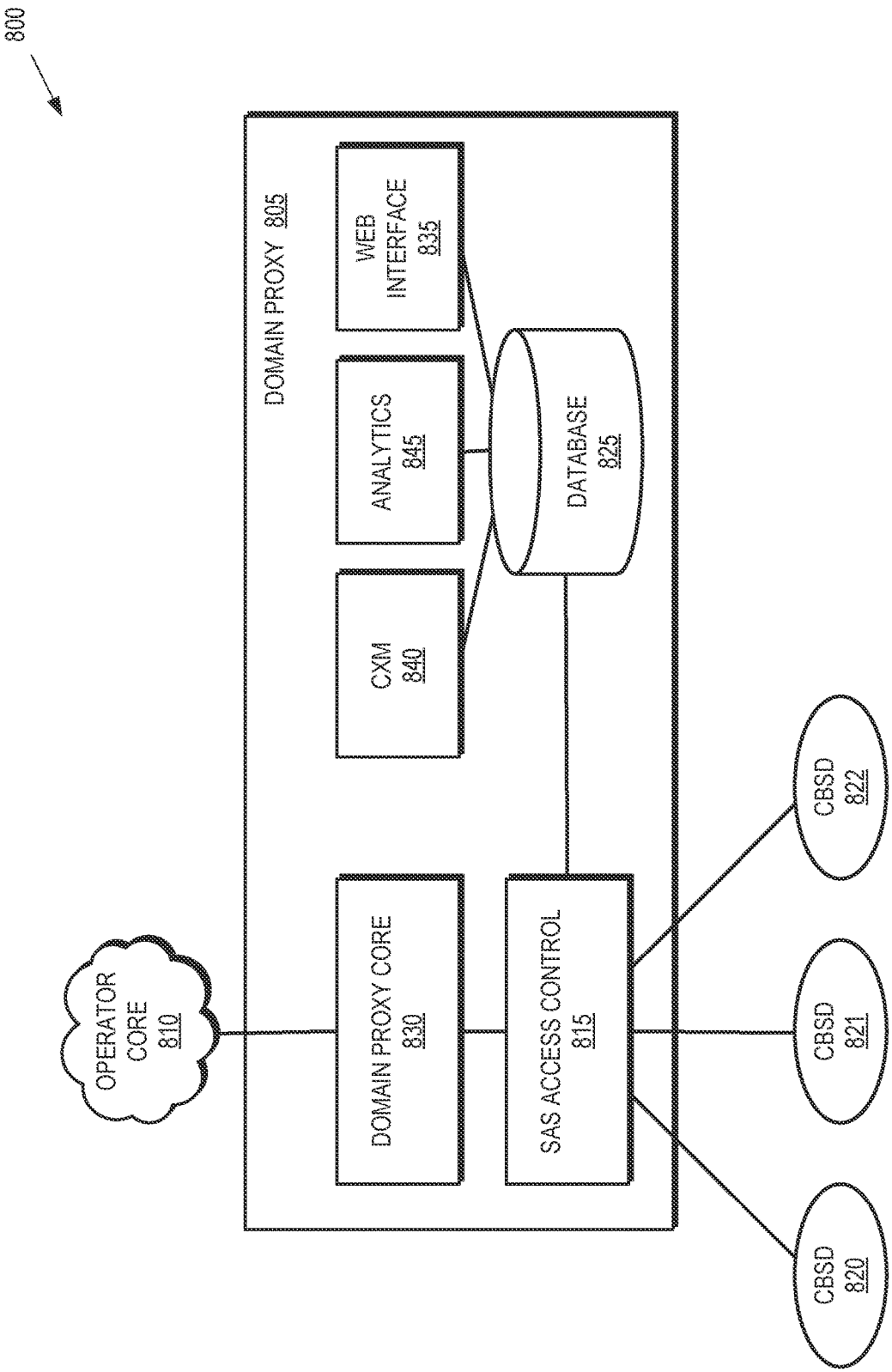
FIG. 8 is a block diagram of a communication system that includes a domain proxy that performs traffic analytics and coexistence management according to some embodiments.

FIG. 8 is a block diagram of a communication system 800 that includes a domain proxy 805 that performs traffic analytics and coexistence management according to some embodiments. The domain proxy 805 is used to implement to some embodiments of the domain proxy 130 shown in FIG. 1, the domain proxy 435 shown in FIG. 4, the instances of the domain proxy 510 shown in FIG. 5, and the domain proxy 640 shown in FIG. 6. In the illustrated embodiment, the domain proxy 805 is connected to an SAS over an interface (such as the interface 620 shown in FIG. 6) via an operator core network 810. However, in other embodiments, the domain proxy 805 is connected to the SAS via the Internet without necessarily traversing an operator core network. The domain proxy 805 includes an SAS access controller 815 that receives access request messages from CBSDs 820-822. The domain proxy 805 also includes a database 825, a domain proxy core 830, and a web interface 835. These elements operate in the same or a similar manner to corresponding elements shown in FIG. 7.

The domain proxy 805 differs from the domain proxy 705 because the domain proxy 805 includes a coexistence manager (CCM) 840 that is used to manage coexistence of different CBSD and different portions of the frequency band. The coexistence manager 840 allows the domain proxy 805 to perform some coexistence management locally (e.g., in a specific domain) in addition to or instead of performing coexistence management globally at the SAS. Local coexistence management can result in improved channel allocation or interference management in the CBRS bands of a corresponding private enterprise network. For example, the coexistence manager 840 can utilize coexistence algorithms to request channels for multicarrier CBSDs 720-722 that are in the domain of the domain proxy 805 or the corresponding enterprise network. In some embodiments, the CBSDs 720-722 perform local radiofrequency sensing to provide information about the presence of other nearby CBSDs that are operated by other operators. The coexistence manager 840 can utilize this information to perform channel allocation or interference mitigation.

The domain proxy 805 includes a traffic analytics module 845. Some embodiments of the traffic analytics module 845 analyze latencies associated with access requests received by the domain proxy 805 from the CBSDs 820-822. For example, the traffic analytics module 845 can determine statistical parameters that characterize latencies required for the SAS to handle access requests received from the CBSDs 820-822 over a particular time interval. Some embodiments of the traffic analytics module 845 analyze information provided by the coexistence manager 840 and associated state information. The traffic analytics module 845 generates configuration information for the domain proxy 805 based on the traffic analytics.

Figure 9:
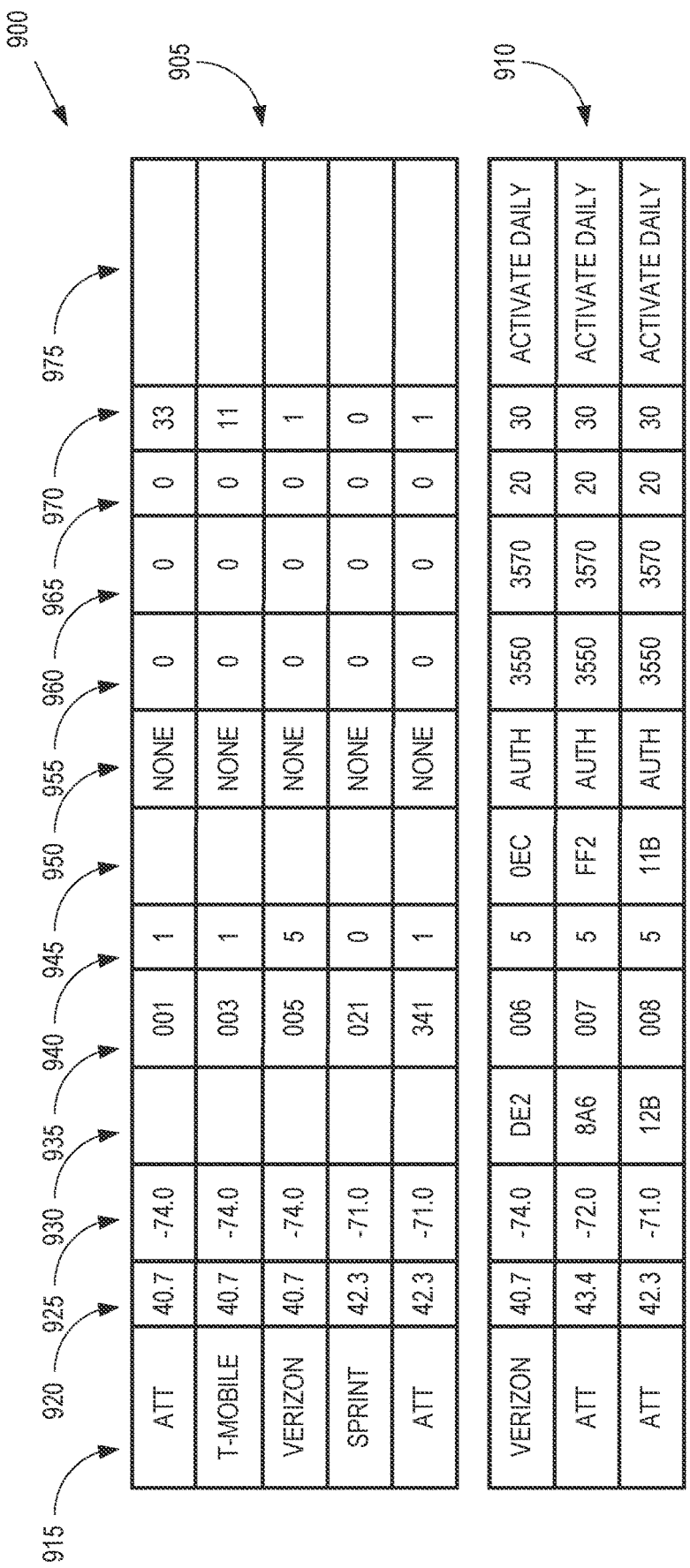
FIG. 9 is a block diagram of a list of policies for CBSDs according to some embodiments.

FIG. 9 is a block diagram of a list 900 of policies for CBSDs according to some embodiments. The list 900 is maintained in some embodiments of the domain proxy 130 shown in FIG. 1, the domain proxy 435 shown in FIG. 4, the instances of the domain proxy 510 shown in FIG. 5, the domain proxy 640 shown in FIG. 6, the database 725 shown in FIG. 7, and the database 825 shown in FIG. 8. Each row in the list 900 represents a policy that is applied to a CBSD. The list 900 is therefore used to support per-CBSD policy management, as discussed herein. The list 900 is separated into groups 905, 910 and the CBSDs associated with the policies in the groups 905, 910 are assigned to the groups 905, 910. The group 905 includes inactive CBSDs. The group 910 includes CBSDs that have been activated and are authorized to request portions of a frequency band from an SAS, as discussed herein.

The column 915 includes information identifying an operator of the corresponding CBSD. Examples of operators include AT&T, T-Mobile, Verizon, and Sprint. The columns 920, 925 include information identifying a location of the CBSD. The column 920 includes a latitude of the CBSD and the column 925 includes a longitude of the CBSD. The column 930 includes a CBSD identifier that is assigned by an SAS. The CBSDs in the inactive group 905 are not assigned a CBSD identifier. The column 935 includes serial numbers of the CBSDs. The column 940 includes information indicating a height (in meters) of one or more antennas deployed by the CBSD. The column 945 includes a grant identifier that identifies a grant of a portion of the frequency band to the corresponding CBSD. The CBSDs in the inactive group 905 are not assigned a grant identifier because they have not been granted a portion of the frequency band. The column 950 indicates a grant state of the CBSDs. The CBSDs in the inactive group 905 have a grant state of "NONE" because they have not been granted a portion of the frequency band. The columns 955, 960, 965 indicate (in megahertz) a starting frequency, ending frequency, and bandwidth, respectively, of the granted portion of the frequency band for the CBSDs in the active group 910. The column 970 indicates an assigned transmit power (in dBm) for the corresponding CBSD. The column 975 includes information identifying a policy that is applied to the CBSD. The CBSDs in the inactive group 905 are not allocated a policy. In the illustrated embodiment, the CBSDs in the active group 910 are assigned a policy of activating the CBSDs daily.

Figure 10:
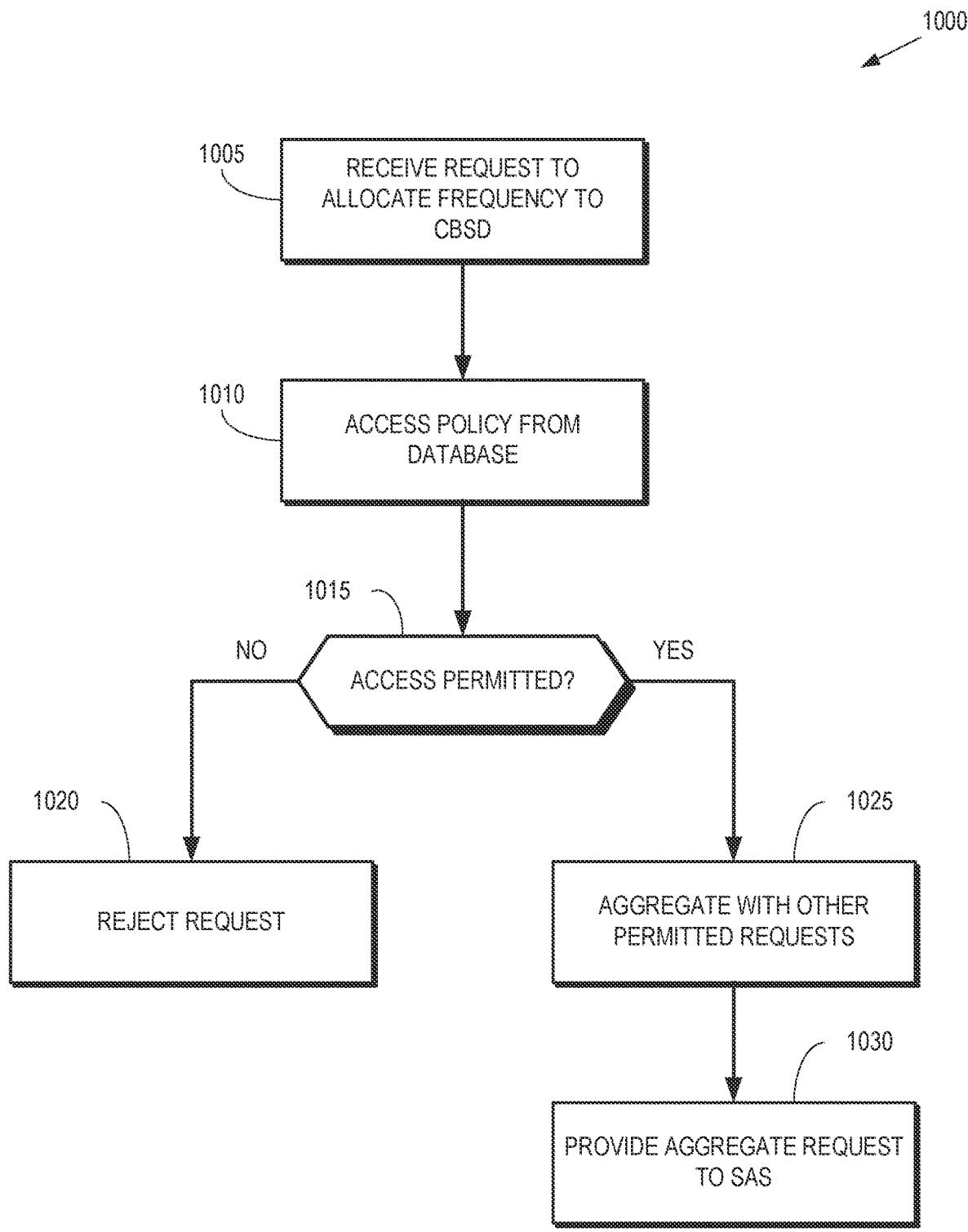
FIG. 10 is a flow diagram of a method of selectively providing frequency allocation requests to an SAS according to some embodiments.

FIG. 10 is a flow diagram of a method 1000 of selectively providing frequency allocation requests to an SAS according to some embodiments. The method 1000 is implemented in a domain proxy such as some embodiments of the domain proxy 130 shown in FIG. 1, the domain proxy 435 shown in FIG. 4, the instances of the domain proxy 510 shown in FIG. 5, the domain proxy 640 shown in FIG. 6, the domain proxy 705 shown in FIG. 7, and the domain proxy 805 shown in FIG. 8.

At block 1005, the domain proxy receives a request for allocation of a portion of a frequency band by an SAS to a CBSD. Some embodiments of the request from the CBSD include information indicating a coverage area of the CBSD, a preferred frequency, a preferred bandwidth, a time interval for usage of the allocated frequency, and the like.

At block 1010, the domain proxy accesses a policy from a database. In some embodiments, the database is implemented within the domain proxy, as discussed herein. However, some embodiments of the database are implemented external to the domain proxy and the domain proxy accesses the database over a corresponding interface. The database includes policies for the CBSDs. The domain proxy therefore accesses the policy for the requesting CBSD from the database.

At decision block 1015, the domain proxy determines whether the CBSD is permitted to request access to a portion of the frequency band from the SAS. The determination is made based on the CBSD policy retrieved from the database. For example, the domain proxy determines that the CBSD is permitted to request access if the policy for the CBSD indicates that the CBSD is activated and authorized to request access. For another example, the domain proxy determines that the CBSD is not permitted to request access if the policy for the CBSD indicates that the CBSD is not activated or is not authorized to request access. The method 1000 flows to block 1020 in response to the domain proxy determining that the CBSD is not permitted to request access. The method 1000 flows to block 1025 in response to the domain proxy determining that the CBSD is permitted to request access.

At block 1020, the domain proxy rejects the request. The rejected request is therefore not provided to the SAS.

At block 1025, the domain proxy aggregates the permitted request with permitted requests from other CBSDs (if available). At block 1030, the domain proxy provides the aggregate request to the SAS. The domain proxy subsequently receives one or more messages from the SAS including information indicating the allocated portions of the frequency band for the requesting CBSDs. The domain proxy provides us information to the requesting CBSDs, which are configured and begin communication on the basis of the received information.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
receiving, at a domain proxy, a request from a base station for allocation of a first portion of a frequency band to support cellular communication in a geographic area that is indicated in the request;
accessing, by the domain proxy from a database accessible to the domain proxy based on the request, a policy for the base station;
determining, by the domain proxy based on the policy for the base station, whether the base station is permitted to request allocation of resources from a spectrum access server (SAS) that is responsible for allocating portions of the frequency band; and
providing, from the domain proxy toward the SAS based on a determination by the domain proxy that the base station is permitted to request allocation of resources from the SAS, the request.

2. The method of claim 1, wherein the frequency band is available for exclusive allocation to an incumbent device, and wherein the base station is required to vacate the first portion of the frequency band in response to the incumbent device arriving in the geographic area and being allocated a second portion of the frequency band that overlaps with the first portion.

3. The method of claim 1, wherein accessing the policy for the base station comprises accessing at least one of information indicating a group of base stations including the base station, information indicating an active time interval for the base station or the group of base stations, and information indicating whether the base station or the group of base stations is active, inactive, or blocked from access to the SAS.

4. The method of claim 1, wherein determining whether the base station is permitted to request allocation of resources from the SAS comprises examining at least one value in at least one mandatory field of the request.

5. The method of claim 4, wherein providing the request to the SAS comprises:
providing the request to the SAS in response to the at least one value indicating that the base station is permitted to request allocation of the first portion of the frequency band.

6. The method of claim 5, wherein the at least one value in the at least one mandatory field comprises an identifier of the base station or a group including the base station, and wherein the domain proxy maintains a list of identifiers of base stations or groups of base stations that are permitted to request allocation of portions of the frequency band.

7. The method of claim 1, wherein providing the request to the SAS comprises aggregating the request with at least one other permitted request and providing the aggregated requests to the SAS.

8. The method of claim 1, further comprising:
providing configuration parameters to the base station, wherein the configuration parameters comprise at least one of a serial number, a geographic location, preferred frequencies in the frequency band, secondary frequencies in the frequency band, a bandwidth, an antenna height, and a transmit power.

9. The method of claim 1, further comprising:
performing, at the domain proxy, a traffic analysis of requests received from base stations; and
configuring parameters of the domain proxy based on the traffic analysis.

10. A domain proxy comprising:
a receiver configured to receive a request from a base station for allocation of a first portion of a frequency band to support cellular communication in a geographic area that is indicated in the request;
a processor configured to:
access, from a database accessible to the domain proxy based on the request, a policy for the base station;
determine, based on the policy for the base station, whether the base station is permitted to request allocation of resources from a spectrum access server (SAS) that is responsible for allocating portions of the frequency band; and
a transmitter configured to selectively provide, toward the SAS based on a determination by the domain proxy that the base station is permitted to request allocation of resources from the SAS, the request.

11. The domain proxy of claim 10, wherein the frequency band is available for exclusive allocation to an incumbent device, and wherein the base station is required to vacate the first portion of the frequency band in response to the incumbent device arriving in the geographic area and being allocated a second portion of the frequency band that overlaps with the first portion.

12. The domain proxy of claim 10, wherein, to access the policy for the base station, the processor is configured to access at least one of information indicating a group of base stations including the base station, information indicating an active time interval for the base station or the group of base stations, and information indicating whether the base station or the group of base stations is active, inactive, or blocked from access to the SAS.

13. The domain proxy of claim 10, wherein, to determine whether the base station is permitted to request allocation of resources from the SAS, the processor is configured to examine at least one value in at least one mandatory field of the request.

14. The domain proxy of claim 13, wherein the transmitter is configured to:
provide the request to the SAS in response to the at least one value indicating that the base station is permitted to request allocation of the first portion of the frequency band.

15. The domain proxy of claim 14, wherein the at least one value in the at least one mandatory field comprises an identifier of the base station or a group including the base station, and wherein the domain proxy maintains a list of identifiers of base stations or groups of base stations that are permitted to request allocation of portions of the frequency band.

16. The domain proxy of claim 10, wherein the processor is configured to aggregate permitted requests received during a predetermined time interval, and wherein the transmitter is configured to provide the aggregated requests to the SAS.

17. The domain proxy of claim 10, wherein the transmitter is configured to provide configuration parameters to the base station, wherein the configuration parameters comprise at least one of a serial number, a geographic location, preferred frequencies in the frequency band, secondary frequencies in the frequency band, a bandwidth, an antenna height, and a transmit power.

18. The domain proxy of claim 10, wherein the processor is configured to perform a traffic analysis of requests received from base stations and configure parameters of the domain proxy based on the traffic analysis.

19. A domain proxy, comprising:
a database to store a policy for a base station, wherein the policy for the base station is indicative as to whether the base station is permitted to request allocation of resources from a spectrum access server (SAS) that is responsible for allocating portions of a frequency band;
an access controller configured to:
receive a request from the base station for allocation of a first portion of the frequency band to support cellular communication in a geographic area that is indicated in the request;
access, from the database based on the request, the policy for the base station; and
determine, based on the policy for the base station, whether the base station is permitted to request allocation of resources from the SAS; and
a domain proxy core configured to provide the request to the SAS based on a determination that the base station is permitted to request allocation of resources from the SAS.

20. The domain proxy of claim 19, further comprising:
a coexistence manager to perform channel allocation and interference mitigation;
an analytics module configured to perform a traffic analysis of requests received from base stations and configure parameters of the domain proxy based on the traffic analysis; and
a web interface to receive configuration parameters that are used to configure the domain proxy.

* * * * *